United States Patent
Kokotovic

[19]

[11] Patent Number: 6,003,880
[45] Date of Patent: Dec. 21, 1999

[54] VEHICLE ACTIVE TILT CONTROL SYSTEM WITH PRESSURE-CONTROLLED PUMP

[75] Inventor: Vladimir V. Kokotovic, Bloomfield Hills, Mich.

[73] Assignee: Ford Motor Company, Dearborn, Mich.

[21] Appl. No.: 09/018,158

[22] Filed: Feb. 3, 1998

[51] Int. Cl.⁶ .................................................... B62D 9/00
[52] U.S. Cl. ..................................... 280/5.506; 280/5.509
[58] Field of Search ........................... 280/5.506, 5.509, 280/5.304, 5.508, 124.106, 124.152

[56] References Cited

U.S. PATENT DOCUMENTS

| | | | |
|---|---|---|---|
| 4,865,347 | 9/1989 | Fukushima et al. | 280/707 |
| 4,892,329 | 1/1990 | Kozaki et al. | 280/5.506 |
| 4,911,468 | 3/1990 | Fukunaga | 280/707 |
| 4,911,469 | 3/1990 | Kawarasaki | 280/707 |
| 4,911,470 | 3/1990 | Fukunaga | 280/707 |
| 5,004,265 | 4/1991 | Mizutani | 280/707 |
| 5,076,606 | 12/1991 | Takahashi | 280/714 |
| 5,087,068 | 2/1992 | Fukanaga et al. | 280/707 |
| 5,160,161 | 11/1992 | Tsukamoto et al. | 280/707 |
| 5,161,822 | 11/1992 | Lund | 280/5.506 |
| 5,215,327 | 6/1993 | Gatter et al. | 280/5.509 |
| 5,348,338 | 9/1994 | Kuriki et al. | 280/707 |
| 5,493,861 | 2/1996 | Friedrichsen | 60/328 |

FOREIGN PATENT DOCUMENTS

| | | |
|---|---|---|
| 0416556 | 2/1990 | European Pat. Off. . |
| 4131076 | 5/1992 | Germany . |
| 2253820 | 7/1992 | United Kingdom . |

*Primary Examiner*—Christopher P. Ellis
*Attorney, Agent, or Firm*—Gregory P. Brown; Roger L. May

[57] ABSTRACT

A vehicle active tilt control system provides improved response time in torsionally adjusting front and rear stabilizer bars during vehicle maneuvers. The system includes front and rear actuators connected, respectively, to the front and rear stabilizer bars for selectively twisting the stabilizer bars. The actuators are moveable in first and second opposing directions for twisting the stabilizer bars in opposing directions. A directional control valve is operatively connected to the front and rear actuators for directing fluid flow to the actuators to selectively cause movement of the actuators in one of the first and second opposing directions. An electrically pressure-controlled pump is operatively connected to the directional control valve for delivering fluid to the directional control valve at controllable pressures, thereby providing improved pressure-control response time which results in improved system performance.

8 Claims, 4 Drawing Sheets

VEHICLE ACTIVE TILT CONTROL SYSTEM WITH PRESSURE-CONTROLLED PUMP

TECHNICAL FIELD

The present invention relates to a vehicle active tilt control system with improved response time in torsionally adjusting front and rear stabilizer bars during vehicle maneuvers and, more particularly, to a vehicle active tilt control system which employs an electrically pressure-controlled pump.

BACKGROUND OF THE INVENTION

Automotive vehicles having independent suspensions are generally equipped with stabilizer bars to reduce inclination or roll of the vehicle bodies during vehicle maneuvers. The stabilizer bar is usually connected between the suspension arms of the vehicle wheels. When the left and right wheels are in similar positions with respect to the suspensions, the stabilizer bar does not twist so that the suspensions are mutually independent. When one of the left wheel and the right wheel passes over a projection on the road surface, or when the vehicle turns and thus the left wheel and the right wheel assume considerably different positions with respect to the suspensions, the stabilizer bar is twisted. This twisting motion induces a torsional resilient force for affecting the rolling characteristic of the vehicle and of the road-surface-following characteristic of the vehicle wheels.

It is desirable that the torsional resilient force of the stabilizer bars can be adjusted in accordance with running or traveling conditions of the vehicle. Specifically, it is desirable to reduce the torsional rigidity during straight travel of the vehicle and to increase the torsional rigidity during turning of the vehicle. The reduced torsional rigidity enhances the road-surface-following characteristic of the vehicle wheels while the increased torsional rigidity enhances the rolling characteristic of the vehicle.

Certain vehicle active tilt control systems include front and rear stabilizer bars which are adjustable by front and rear hydraulic actuators placed in lieu of the stabilizer bar linkages. The actuators are moveable in first and second opposing directions for adjusting vehicle body roll active roll moment to compensate for vehicle roll.

Current active tilt control systems on the market use flow-controlled pumps and an additional pressure control valve on the main line for controlling the oil pressure which drives the actuators. The flow-controlled pumps provide fluid to a main flow line, and an electronically controlled pressure relief valve of the main flow line controls the fluid pressure. In this method, the entire flow is controlled by the single stage electrically operated pressure relief valve. Typically, flow gain of these valves are limited by design restrictions. The use of such a single stage valve slows system response time, and as a result of this, the system cannot compensate for the roll moment during evasive cornering maneuvers.

Referring to FIGS. 1 and 2, a flow-controlled pump 10 is shown schematically and graphically as used in prior art active tilt control systems. The flow control function within the flow-controlled pump 10 is provided by a flow-control circuit. The flow-controlled pump 10 includes a rotary pump group 12 and a spool valve 14. The rotary pump group 12 draws fluid from the tank 16 and feeds fluid through the spool valve 14 and orifice 18 to the main line 20. The fixed orifice 18 provides a pressure drop as a measure of the flow. This pressure drop is captured by the spool valve 14. At a predetermined pressure difference, the metering orifice of the valve 14 starts relieving oil into the reservoir 16, providing the flat flow characteristic shown in FIG. 2 for different flow rates. This break point A1 or A2 in the flow control characteristic, as shown in FIG. 2, is dependent upon the size of the orifice 18.

In order to provide good flow regulation, the metering orifice of the main flow spool valve has a high flow gradient. However, the buildup of the pressure differential across the main spool 14 is typically a slow process, which results in slow response to flow demand.

Typically, the active tilt control system will have an additional pressure relief valve on the main flow line 20 such that downstream flow is divided again. The first portion of the flow is used for the active tilt control system operation and the second portion of the flow is used for pressure control, i.e., it is returned back to the tank 16. A disadvantage of such a system is that the pump's flow is limited and cannot provide higher instantaneous flow, which results in a slower response time for the active tilt control system. The single stage pressure control valve that controls the pressure in the main line must provide a fast response as well as good flow and pressure characteristics. However, the flow gradient of this valve cannot be as high as the flow gradient of the main spool valve. Even if the single stage pressure control valve has good pressure characteristics, the amount of flow that is flowing through the valve is significant. This means that the actuators do not receive the largest amount of flow when the fast response is needed. Accordingly, flow is wasted.

Therefore, it is desirable to provide an active tilt control system with improved controllability for quicker response during vehicle maneuvers.

DISCLOSURE OF THE INVENTION

The present invention overcomes the above-referenced shortcomings of vehicle active tilt control systems by providing a vehicle active tilt control system with a pressure-controlled pump. A pressure-controlled pump provides greatly improved system response time by responding to pressure demand more quickly.

More specifically, the present invention provides a vehicle active tilt control system with improved response time in torsionally adjusting front and rear stabilizer bars during vehicle maneuvers. The system includes front and rear actuators connected, respectively, to the front and rear stabilizer bars for selectively twisting the stabilizer bars. The actuators are moveable in first and second opposing directions for twisting the stabilizer bars in opposing directions. A directional control valve is operatively connected to the front and rear actuators for directing fluid flow to the actuators to selectively cause movement of the actuators in one of the first and second opposing directions. An electrically pressure-controlled pump is operatively connected to the directional control valve for delivering fluid to the directional control valve at controllable pressures, thereby providing improved pressure control response time which results in improved system performance.

Accordingly, an object of the present is to provide a vehicle active tilt control system incorporating a pressure-controlled pump to improve response time during vehicle maneuvers, thereby improving system performance.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 3:
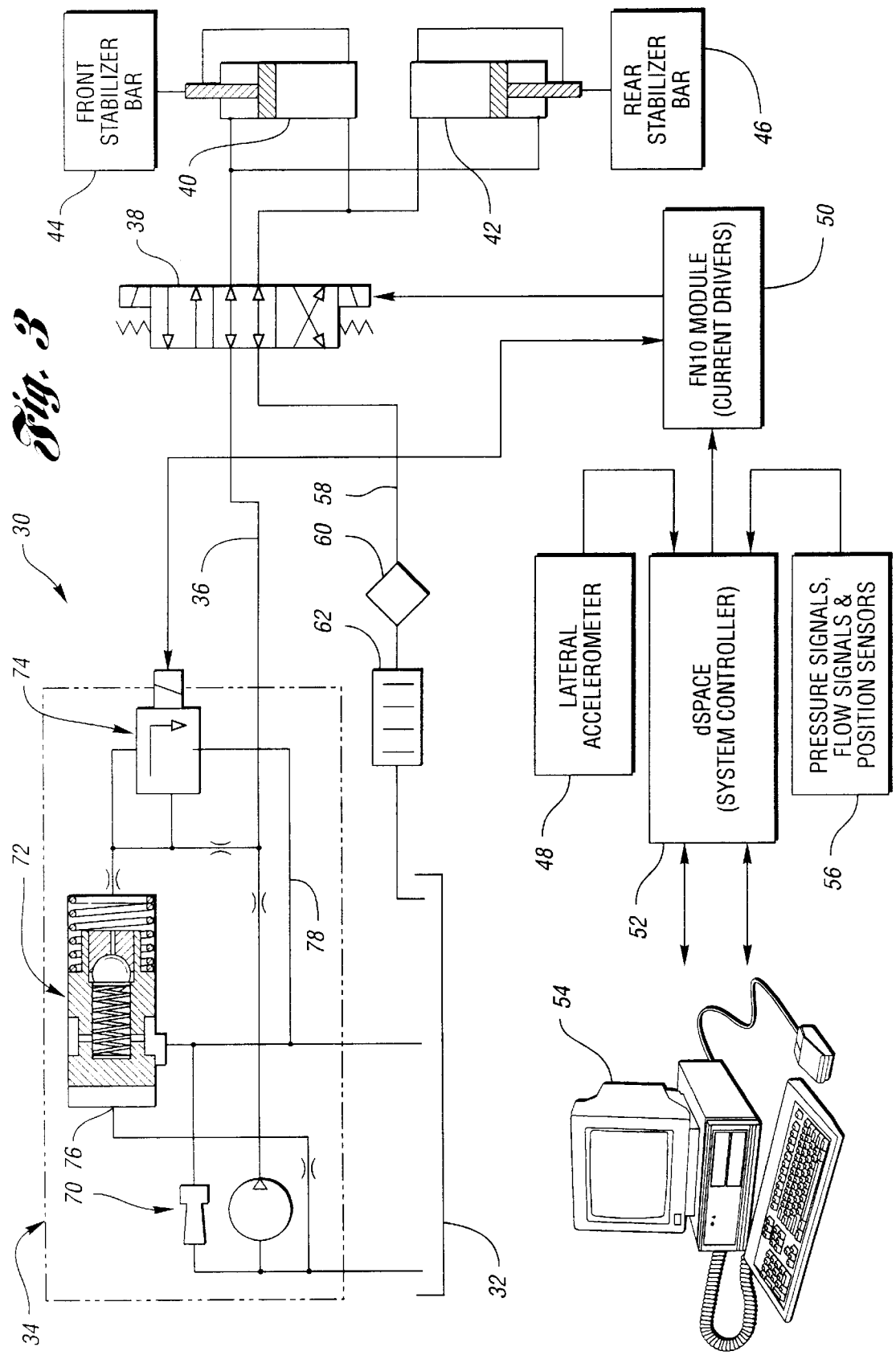
FIG. 3 shows a schematic of a vehicle active tilt control system using a pressure-controlled pump in accordance with the present invention.

Referring to FIG. 3, a vehicle active tilt control system 30 is shown in accordance with the present invention. As shown, a hydraulic tank 32 provides hydraulic fluid which is pumped by the pump 34 to the main line 36. A directional control valve 38 is connected to the main line 36.

The directional control valve 38 selectively directs the pressurized fluid to opposing chambers in the front and rear actuators 40,42 for establishing the direction of movement of the actuators 40,42. The front and rear actuators 40,42 are connected, respectively, the front and rear stabilizer bars 44,46 in lieu of the stabilizer bar linkages. Preferably, the front and rear actuators 40,42 are single rod end double acting actuators. The actuators 40,42 wind-up the stabilizer bars 44,46, thus creating the desired force needed to resist body roll during vehicle maneuvers.

The vehicle active tilt control system 30 includes only a single lateral accelerometer 48 which measures the direction and magnitude of lateral acceleration during vehicle maneuvers. For purposes of testing the strategy, a particular vehicle control module 50, system controller 52, and lap-top computer 54 were provided as shown in FIG. 3 for receiving the signals 56, as well as lateral accelerometer 48 signals for controlling the directional control valve 38 and the pressure-controlled pump 34. Of course, in operation, the present invention will use an existing vehicle computer rather than the lap top computer 54 for control.

FIG. 3 also illustrates a fluid return circuit 58, which includes a filter 60 and cooler 62 for returning the hydraulic fluid to the tank 32 from the actuators 40,42.

The present invention is more specifically characterized by the pump 34, which is an electrically pressure-controlled pump. The pump 34 includes a rotary type vane pump 70, a flow control valve 72, and a pressure control valve 74 connected to the flow control valve 72 for affecting operation of the flow control valve 72. The pressure control valve 74 is electrically controlled by the control module 50.

Figure 4:
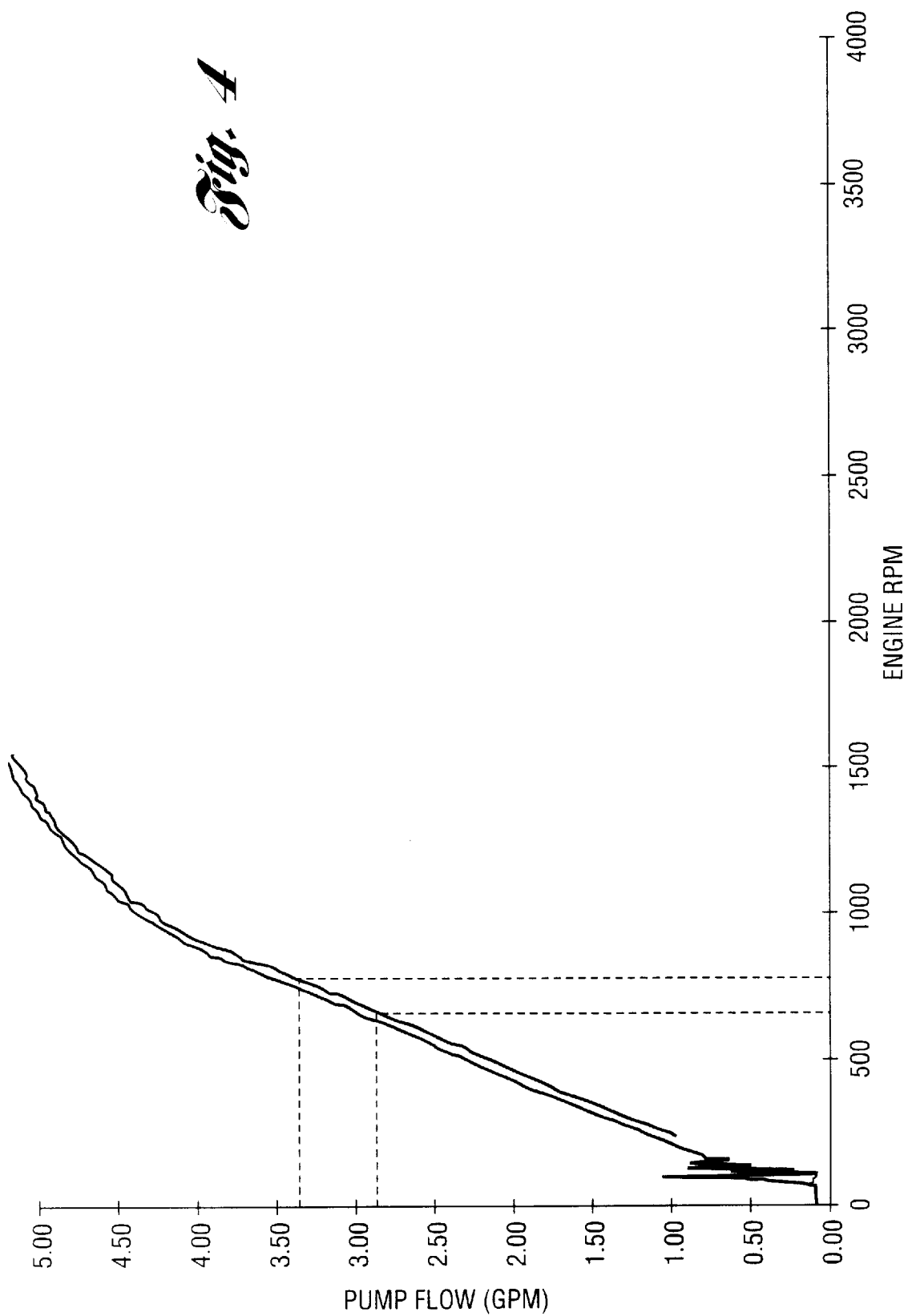
FIG. 4 shows a graphical illustration of pump flow vs. engine RPM in the active tilt control system illustrated in FIG. 3.

The flow characteristic of the pump 34 is illustrated in FIG. 4. The flow characteristic of the system is determined by the pump displacement and pump RPM. It can be seen that the pressure-controlled pump may provide a higher flow to compensate for the system flow demands when pressure is maintained at a constant level. In other words, more flow is available in order to compensate for system pressure loss. Therefore, the pressure-controlled pump in the active tilt control system 30 of the present invention provides improved response time when compared with the prior art flow-controlled pump.

The pressure control valve 74 is, preferably, an electrically operated single stage pilot-type pressure relief valve which controls the pressure inside the main spool spring chamber of the flow control valve 72. The opposite side 76 of the flow control valve 72 is loaded with supply pressure from the pump rotational group 70. The force balance on the main spool 72 is controlled by the pilot valve 74. The pilot valve 74 returns a small amount of flow to the reservoir 32 via the flow line 78 when necessary.

Accordingly, the pressure controlled pump active tilt control system provides the pressure control by controlling the pressure within a very small spring chamber volume of the main stage flow control valve spool. This is provided by the single stage pressure relief valve or pressure control valve. However, the pressure and flow characteristics of this small pilot single stage valve are significantly different when compared with the same characteristics of the pressure control valve on the main line and the flow control pump, as described previously. Namely, a small needle pressure control valve has much higher flow gain characteristics relative to the size of the volume whose pressure needs to be controlled. The flow gain of the small valve is easily adjustable and power needed to control this pressure is significantly less than in traditional systems.

In this case, the small pilot single stage pressure control solenoid valve is used as a pilot valve to control the main flow control spool valve 72. An advantage of this configuration is that much less flow is wasted or branched to the reservoir.

The pressure differential across the main flow valve 72 is controlled much faster than with a flow control pump. As a result, the main spool is controlled more quickly. In addition to this, for controlling the pressure in the main line, the metering orifice of the main control valve is used. This metering orifice has a significantly higher flow gain characteristic than the flow gain characteristic of the pressure control valve on the main line in the traditional flow controlled system.

It should be noted that a pressure-controlled pump controls the pressure by returning oil to the reservoir 32. However, the amount of available flow for pressure compensation purposes is dependent upon the flow characteristic of the pump. One can readily see in comparing FIGS. 2 and 4 that the flow characteristic of the pressure-controlled pump illustrated in FIG. 4 may provide much greater flow at higher RPMs to compensate for pressure losses, which means that the pressure-controlled pump of the present invention results in improved response time of the active tilt control system 30.

Figure 1:
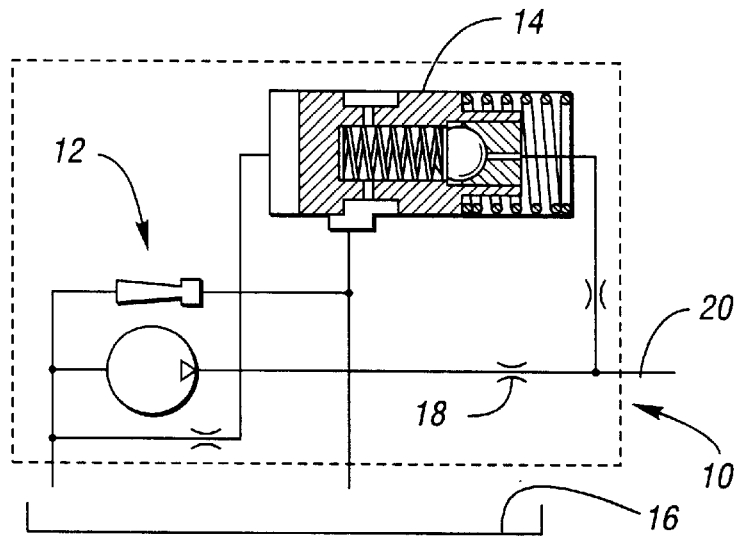
FIG. 1 shows a schematic of a flow-controlled pump used in prior art vehicle active tilt control systems.
Figure 3C:
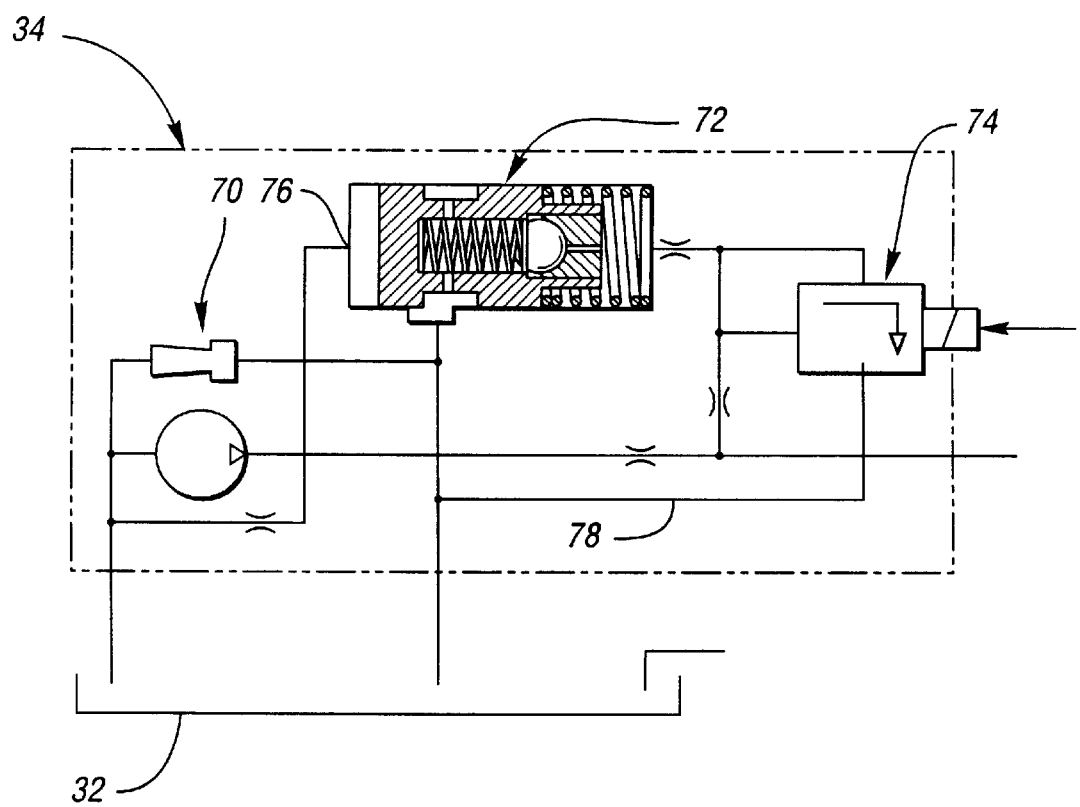
FIG. 3c is an enlarged schematic of a pressure controlled pump taken from FIG. 3.

The pressure-controlled pump of the present invention provides a high flow gain characteristic because flow is not primarily limited by a single orifice, such as the orifice 18 shown in FIG. 1. Rather, the pressure control valve 74 used in conjunction with the flow control valve 72 provides a high flow gain characteristic, which means that the pressure-controlled pump 34 used with a vehicle active tilt control system 30 in accordance with the present invention is faster in both directions when pressure must be reduced or increased to compensate for a system demand.

Figure 2:
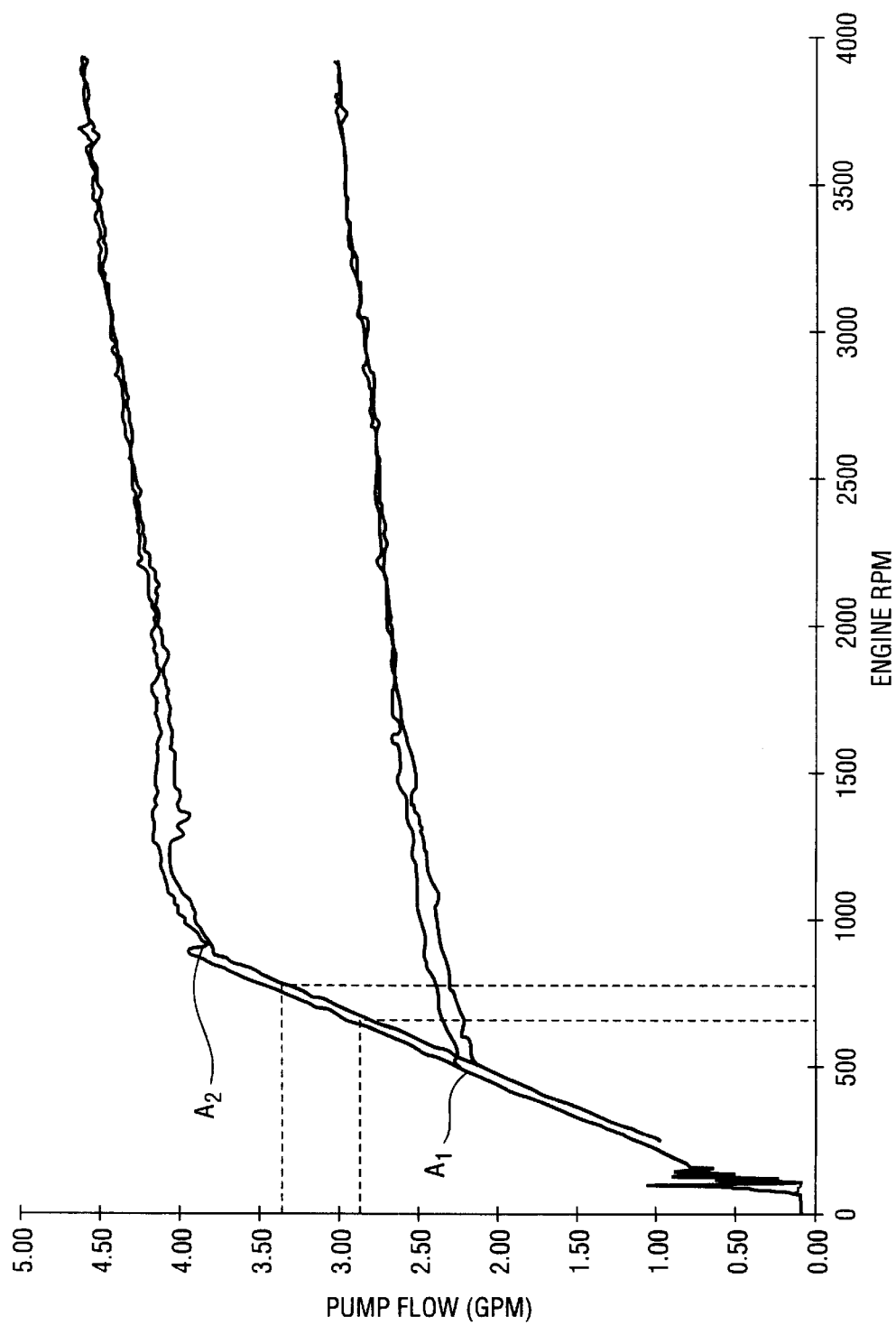
FIG. 2 shows a graph of pump flow vs. engine RPM for prior art vehicle active tilt control systems using flow-controlled pumps.

Referring to FIG. 4, the pump flow vs. engine RPM curve is not a flat, regulated flow curve as illustrated in FIG. 2 for the prior art, but rather tails off only slightly based upon efficiency losses in the system. Accordingly, higher flow rates can be achieved which results in significantly improved system response times.

More effective savings could be achieved with integration of different hydraulic systems within the vehicle. One combination would comprise combining the hydraulic cooling fan system with the active tilt control system. A single pump would supply both systems. For this integration, both systems use the pressure control pump. The active tilt control system would have priority during cornering events. During this short period of time, the entire flow would be used by the active tilt control system.

The advantages of using the pressure-controlled pump are even more pronounced when it comes to packaging of a different pump for every vehicle system. In a case in which a single pressure-controlled pump is used for active tilt control and for a hydraulic cooling fan system, only a single pulley must be used. Further cost reduction with increased performance and easier packaging would be achieved with a tandem pump made of a pressure-controlled pump and flow-controlled pump. In this case, three systems can be supplied with the use of a single pulley. The power steering system would use the flow-controlled pump, and the active tilt control system and hydraulic cooling fan system would use the pressure-controlled pump. Additional price reductions may be achieved with implementation of these systems on different vehicle platforms.

While the best mode for carrying out the invention has been described in detail, those familiar with the art to which this invention relates will recognize various alternative designs and embodiments for practicing the invention within the scope of the appended claims.

What is claimed is:

1. A vehicle active tilt control system with improved response time in torsionally adjusting front and rear stabilizer bars during vehicle maneuvers, the system comprising:

front and rear actuators connected, respectively, to the front end rear stabilizer bars for selectively twisting the stabilizer bars, wherein the actuators are movable in first and second opposing directions for twisting the stabilizer bars in opposing directions;

a directional control valve operatively connected to said front and rear actuators for directing fluid flow to the actuators to selectively cause movement of the actuators in one of said first and second opposing directions; and an electrically pressure-controlled pump operatively connected to the directional control valve for delivering fluid to the directional control valve at controllable pressures, thereby providing improved pressure control response time which results in improved system performance.

2. The vehicle active tilt control system of claim 1, wherein said electrically pressure-controlled pump comprises:

a vane pump;

a flow control valve receiving fluid from said vane pump; and a pressure control valve connected to the flow control valve for affecting operation of the flow control valve, wherein the pressure control valve is electrically controlled.

3. The vehicle active tilt control system of claim 2, wherein said pressure control valve comprises a single-stage solenoid-operated pilot valve.

4. The vehicle active tilt control system of claim 2, further comprising a tank arranged to provide fluid to the vane pump and to selectively receive fluid from said flow control valve and pressure control valve.

5. A vehicle active tilt control system with improved response time in adjusting front and rear stabilizer bars during vehicle maneuvers, the system comprising:

front and rear actuators connected, respectively, to the front and rear stabilizer bars for selectively twisting the stabilizer bars, wherein the actuators are moveable in first and second opposing directions for twisting the stabilizer bars in opposing directions;

a directional control valve operatively connected to said front and rear actuators for directing fluid flow to the actuators to selectively cause movement of the actuators in one of said first and second opposing directions; and an electrically pressure-controlled pump operatively connected to the directional control valve for delivering fluid to the directional control valve at controllable pressures, thereby providing improved pressure control response time which results in improved system performance;

wherein said electrically pressure-controlled pump includes a vane pump, a main stage flow control pressure relief valve receiving fluid from said vane pump, and a pressure control valve connected to the main stage flow control pressure relief valve for affecting operation of the flow control valve, wherein the pressure control valve is electrically controlled.

6. The vehicle active tilt control system of claim 5, wherein said pressure control valve comprises a solenoid-operated pilot valve.

7. The vehicle active tilt control system of claim 5, further comprising a tank arranged to provide fluid to the vane pump and to selectively receive fluid from said flow control valve and pressure control valve.

8. A vehicle active tilt control system with improved response time in adjusting front and rear stabilizer bars during vehicle maneuvers, the system comprising:

front and rear actuators connected, respectively, to the front and rear stabilizer bars for selectively twisting the stabilizer bars, wherein the actuators are moveable in first and second opposing directions for twisting the stabilizer bars in opposing directions;

a directional control valve operatively connected to said front and rear actuators for directing fluid flow to the actuators to selectively cause movement of the actuators in one of said first and second opposing directions;

a fluid tank;

an electrically pressure-controlled pump operatively connected between said fluid tank and said directional control valve, and including a vane pump operative to pump fluid from said fluid tank, a flow control valve receiving fluid from said vane pump and selectively returning fluid to said tank, and a solenoid operated pilot valve connected to the flow control valve for affecting operation of the flow control valve, said solenoid operated pilot valve being operative to selectively return fluid to said tank.

* * * * *